United States Patent
Coffing (10) Patent No.: US 11,429,794 B2
(45) Date of Patent: Aug. 30, 2022

(54) SYSTEM FOR PROVIDING DIALOGUE GUIDANCE

(71) Applicant: Daniel L. Coffing, Fairfax, VA (US)

(72) Inventor: Daniel L. Coffing, Fairfax, VA (US)

( * ) Notice: Subject to any disclaimer, the term of this patent is extended or adjusted under 35 U.S.C. 154(b) by 76 days.

(21) Appl. No.: 16/563,461

(22) Filed: Sep. 6, 2019

(65) Prior Publication Data

US 2020/0081987 A1    Mar. 12, 2020

Related U.S. Application Data

(60) Provisional application No. 62/727,965, filed on Sep. 6, 2018.

(51) Int. Cl.
| | |
|---|---|
| *G06F 40/56* | (2020.01) |
| *G06F 16/332* | (2019.01) |
| *G06F 40/20* | (2020.01) |
| *G06V 40/20* | (2022.01) |

(52) U.S. Cl.
CPC .......... *G06F 40/56* (2020.01); *G06F 16/3329* (2019.01); *G06F 40/20* (2020.01); *G06V 40/20* (2022.01)

(58) Field of Classification Search
CPC ...... G06F 40/56; G06F 40/20; G06F 16/3329; G06K 9/00335
USPC .................................................... 704/254, 9
See application file for complete search history.

(56) References Cited

U.S. PATENT DOCUMENTS

| | | |
|---|---|---|
| 6,347,332 B1 | 2/2002 | Malet et al. |
| 6,678,828 B1 | 1/2004 | Pham et al. |
| 7,509,572 B1 | 3/2009 | Melander |
| 8,438,142 B2 | 5/2013 | Wu et al. |
| 8,538,743 B2 | 9/2013 | Gago et al. |
| 9,047,283 B1 | 6/2015 | Zhang et al. |
| 9,565,175 B1 | 2/2017 | Saylor et al. |
| 9,643,722 B1 | 5/2017 | Myslinski |
| 9,652,113 B1 * | 5/2017 | Colson ............... G10L 15/26 |

(Continued)

FOREIGN PATENT DOCUMENTS

| | | |
|---|---|---|
| CN | 106611055 | 5/2017 |
| EP | 1 352 338 | 10/2003 |

(Continued)

OTHER PUBLICATIONS

Katzav et al.; "A Classification System for Arguments", 2012 [retrieved on Aug. 6, 2014] Retrieved from the internet <URL: http://www.arg.dundee.ac.uk/people/chris/publications/2004/ClassifyingArguments.pdf>. Entire document.

(Continued)

*Primary Examiner* — Akwasi M Sarpong
(74) *Attorney, Agent, or Firm* — Polsinelli LLP (57) ABSTRACT

Various aspects of the subject technology relate to a dialogue guidance system. The dialogue guidance system is configured to receive input data captured from a communication event among at least a first participant and a second participant. The input data may include one or more of text data, audio data, or video data. The dialogue guidance system is configured to identify, based on the input data, one of a sentiment or a disposition corresponding to the communication event, determine dialogue guidance for the first participant based on one of the sentiment or the disposition, and provide the dialogue guidance to the first participant.

22 Claims, 5 Drawing Sheets

(56) References Cited

U.S. PATENT DOCUMENTS

| | | | |
|---|---|---|---|
| 9,916,538 B2 | 3/2018 | Zadeh et al. | |
| 10,075,439 B1 | 9/2018 | Mullens et al. | |
| 10,134,072 B2 | 11/2018 | Phillips et al. | |
| 10,346,542 B2* | 7/2019 | Woofers | G06F 40/40 |
| 10,395,216 B2 | 8/2019 | Coffing et al. | |
| 11,023,601 B2 | 6/2021 | Quint | |
| 11,042,711 B2 | 6/2021 | Coffing | |
| 11,170,092 B1 | 11/2021 | Liang | |
| 2003/0084425 A1 | 5/2003 | Glaser | |
| 2003/0088783 A1 | 5/2003 | DiPierro | |
| 2004/0078726 A1 | 4/2004 | Little et al. | |
| 2005/0251452 A1 | 11/2005 | Roever et al. | |
| 2005/0278529 A1 | 12/2005 | Kano | |
| 2006/0122834 A1 | 6/2006 | Bennett | |
| 2006/0200259 A1 | 9/2006 | Hoffberg et al. | |
| 2008/0222279 A1 | 9/2008 | Cioffi et al. | |
| 2009/0100053 A1 | 4/2009 | Boschee et al. | |
| 2009/0117883 A1 | 5/2009 | Coffing et al. | |
| 2009/0144302 A1 | 6/2009 | Baldwin | |
| 2009/0192968 A1 | 7/2009 | Tunstall-Pedoe | |
| 2009/0234958 A1 | 9/2009 | Lee | |
| 2009/0326919 A1 | 12/2009 | Bean | |
| 2010/0030744 A1 | 2/2010 | DeShan et al. | |
| 2010/0063799 A1 | 3/2010 | Jamieson | |
| 2010/0088262 A1 | 4/2010 | Visel et al. | |
| 2010/0242023 A1 | 9/2010 | Han et al. | |
| 2011/0071978 A1 | 3/2011 | Lottridge et al. | |
| 2011/0295392 A1* | 12/2011 | Cunnington | H04N 7/15 |
| | | | 700/90 |
| 2011/0320396 A1 | 12/2011 | Hunt et al. | |
| 2011/0320450 A1 | 12/2011 | Liu et al. | |
| 2012/0030729 A1 | 2/2012 | Schwartz et al. | |
| 2012/0066493 A1 | 3/2012 | Widergren et al. | |
| 2012/0166373 A1 | 6/2012 | Sweeney et al. | |
| 2012/0226646 A1 | 9/2012 | Donoho et al. | |
| 2013/0179386 A1 | 7/2013 | Schindler | |
| 2013/0205362 A1 | 8/2013 | Kiehtreilber et al. | |
| 2013/0291085 A1 | 10/2013 | Chong et al. | |
| 2014/0053227 A1 | 2/2014 | Ruppin et al. | |
| 2014/0172417 A1 | 6/2014 | Monk et al. | |
| 2014/0188462 A1 | 7/2014 | Zadeh | |
| 2014/0201126 A1 | 7/2014 | Zadeh et al. | |
| 2014/0297252 A1 | 10/2014 | Prasad et al. | |
| 2014/0343984 A1 | 11/2014 | Shahabi et al. | |
| 2015/0066479 A1 | 3/2015 | Pasupalak et al. | |
| 2015/0195406 A1* | 7/2015 | Dwyer | G06F 40/279 |
| | | | 379/265.07 |
| 2015/0227364 A1 | 8/2015 | Asadullah et al. | |
| 2015/0293897 A1 | 10/2015 | Myslinski | |
| 2016/0063993 A1* | 3/2016 | Dolan | G06F 16/00 |
| | | | 704/254 |
| 2016/0078339 A1* | 3/2016 | Li | G06N 3/084 |
| | | | 706/20 |
| 2016/0148159 A1 | 5/2016 | Coffing | |
| 2016/0180238 A1 | 6/2016 | Alboszta et al. | |
| 2016/0196342 A1 | 7/2016 | Kim et al. | |
| 2016/0277373 A1 | 9/2016 | Murray | |
| 2016/0292289 A1 | 10/2016 | Milvaney et al. | |
| 2016/0306800 A1 | 10/2016 | Son et al. | |
| 2016/0350278 A1* | 12/2016 | Aharoni | G06F 16/27 |
| 2017/0024551 A1 | 1/2017 | Phadke et al. | |
| 2017/0070841 A1 | 3/2017 | Shalunov et al. | |
| 2017/0094364 A1 | 3/2017 | Karim et al. | |
| 2017/0132207 A1* | 5/2017 | Goldstein | G06F 16/3329 |
| 2017/0193004 A1 | 7/2017 | Karuppusamy et al. | |
| 2017/0232300 A1 | 8/2017 | Tran et al. | |
| 2017/0277993 A1* | 9/2017 | Beaver | G06F 40/40 |
| 2017/0289120 A1 | 10/2017 | Kohli | |
| 2017/0330285 A1 | 11/2017 | Ehrhart et al. | |
| 2017/0371861 A1 | 12/2017 | Barborak et al. | |
| 2018/0004718 A1* | 1/2018 | Pappu | G06F 40/35 |
| 2018/0068358 A1 | 3/2018 | Hoffberg et al. | |
| 2018/0082076 A1 | 3/2018 | Murray | |
| 2018/0083893 A1* | 3/2018 | Viswanathan | G06F 40/35 |
| 2018/0139222 A1 | 5/2018 | Wan | |
| 2018/0173203 A1 | 6/2018 | Freer et al. | |
| 2018/0174020 A1* | 6/2018 | Wu | G06N 3/08 |
| 2018/0181973 A1 | 6/2018 | Lynch | |
| 2018/0189504 A1 | 7/2018 | Ghafourifar et al. | |
| 2018/0189732 A1 | 7/2018 | Kozloski et al. | |
| 2018/0196796 A1* | 7/2018 | Wu | G06F 40/289 |
| 2018/0204111 A1 | 7/2018 | Zadeh et al. | |
| 2018/0293224 A1* | 10/2018 | Bostick | G06F 40/35 |
| 2018/0307673 A1* | 10/2018 | Akkiraju | G06N 5/04 |
| 2018/0308094 A1 | 10/2018 | Jayaram et al. | |
| 2019/0013038 A1* | 1/2019 | Thomson | G06F 40/20 |
| 2019/0050445 A1 | 2/2019 | Griffith et al. | |
| 2019/0073914 A1 | 3/2019 | Contractor et al. | |
| 2019/0080022 A1 | 3/2019 | Matsuo | |
| 2019/0080392 A1 | 3/2019 | Youb et al. | |
| 2019/0129974 A1 | 5/2019 | Choi | |
| 2019/0180255 A1 | 6/2019 | Deshpande et al. | |
| 2019/0180867 A1* | 6/2019 | Carbonell | G16H 20/40 |
| 2019/0205219 A1 | 7/2019 | Graham et al. | |
| 2019/0205381 A1* | 7/2019 | Raux | G06F 40/30 |
| 2019/0213344 A1 | 7/2019 | Hesketh et al. | |
| 2019/0272383 A1 | 9/2019 | Luttwak et al. | |
| 2019/0303522 A1 | 10/2019 | Green et al. | |
| 2019/0354389 A1 | 11/2019 | Du et al. | |
| 2019/0370335 A1 | 12/2019 | Coffing | |
| 2019/0377901 A1* | 12/2019 | Balzer | H04L 63/0421 |
| 2019/0392393 A1 | 12/2019 | Coffing | |
| 2020/0042721 A1 | 2/2020 | Castinado et al. | |
| 2020/0042864 A1 | 2/2020 | Nguyen et al. | |
| 2020/0073922 A1 | 3/2020 | Coffing | |
| 2020/0074117 A1 | 3/2020 | Camenisch et al. | |
| 2020/0092301 A1 | 3/2020 | Coffing | |
| 2020/0159928 A1 | 5/2020 | Herrin et al. | |
| 2020/0159946 A1 | 5/2020 | Castinado et al. | |
| 2020/0175961 A1* | 6/2020 | Thomson | G10L 15/063 |
| 2020/0184278 A1 | 6/2020 | Zadeh et al. | |
| 2020/0192872 A1 | 6/2020 | Quinn | |
| 2020/0193019 A1 | 6/2020 | Tietz et al. | |
| 2020/0195441 A1 | 6/2020 | Suen et al. | |
| 2020/0204376 A1 | 6/2020 | Nandakumar et al. | |
| 2021/0081212 A1 | 3/2021 | Pestana et al. | |
| 2021/0383071 A1 | 12/2021 | Coffing | |

FOREIGN PATENT DOCUMENTS

| | | |
|---|---|---|
| EP | 3 769 238 | 1/2021 |
| EP | 3 847 643 | 7/2021 |
| EP | 3 850 781 | 7/2021 |
| WO | WO 2014/146086 | 9/2014 |
| WO | WO 2017/106792 | 6/2017 |
| WO | WO 2017/222738 | 12/2017 |
| WO | WO 2019/183144 | 9/2019 |
| WO | WO 2020/051500 | 3/2020 |
| WO | WO 2020/056409 | 3/2020 |
| WO | WO 2020/086155 | 4/2020 |

OTHER PUBLICATIONS

Pinto; "The Account of Warrants in Bermejo-Luque's Giving Reasons." 2011. [retrieved on Aug. 6, 2014], Retrieved from the Internet:<URL: http://www.ehu.es/ojs/index.php/THEORIA/article/viewFile/2950/2634>. Entire document.

Simosi, Maria; Using Toulmin's Framework for the Analysis of Everyday Argumentation: Some Methodological Considerations. 2003. [retrieved on Aug. 6, 2014] Retrieved from the Internet:<URL:http://www.syros.aegean.gr/users/simosi/simosi_webpage_files/toulmin.pdf>. entire document.

Trzesicki, Kazimierz; Arguments and their Classification. 2011. [retrieved on Aug. 6, 2014], Retrieved from the Internet:<URL:http://logika.uwb.edu.pl/studies/download/php?volid=36&artid=kt>. Entire document.

Wyner, Adam; "Multi-Modal Multi-threaded Online Forums", 2009, Google, 9 pages.

PCT Application No. PCT/US2014/031031 International Search Report and Written Opinion dated Aug. 25, 2014.

PCT Application No. PCT/US2019/023034 International Search Report and Written Opinion dated Jun. 21, 2019.

(56) References Cited

OTHER PUBLICATIONS

PCT Application No. PCT/US2019/050020 International Search Report and Written Opinion dated Dec. 18, 2019.
PCT Application No. PCT/US2019/051294 International Search Report and Written Opinion dated Jan. 22, 2020.
U.S. Appl. No. 14/897,253 Final Office Action dated Jan. 23, 2019.
U.S. Appl. No. 14/897,253 Office Action dated Feb. 26, 2018.
PCT Application No. PCT/US2014/031031 International Preliminary Report On Patentability dated Sep. 15, 2015; 5 pages.
PCT Application No. PCT/US2019/023034 International Preliminary Report On Patentability dated Sep. 22, 2020; 10 pages.
U.S. Appl. No. 16/358,757 Office Action dated Sep. 21, 2020.
U.S. Appl. No. 16/559,519 Office Action dated Nov. 16, 2020.
PCT Application No. PCT/US2019/049390 International Search Report and Written Opinion dated Apr. 8, 2020.
PCT/US19/50020, System For Providing Dialogue Guidance, Sep. 6, 2019.
U.S. Appl. No. 16/571,993, Daniel L. Coffing, Fact Managment System, filed Sep. 16, 2019.
PCT/US19/51294, Fact Management System, Sep. 16, 2019.
U.S. Appl. No. 16/559,519, Daniel L. Coffing, System and Method For Vocabulary Alignment, filed Sep. 3, 2019.
PCT/US19/49390, System and Method For Vocabulary Alignment, Sep. 3, 2019.
PCT Application No. PCT/US2019/050020 International Preliminary Report on Patentability dated Mar. 9, 2021; 6 pages.
PCT Application No. PCT/US2019/051294 International Preliminary Report on Patentability dated Mar. 9, 2021; 6 pages.
PCT Application No. PCT/US2019/049390 International Preliminary Report on Patentability dated Mar. 2, 2021; 4 pages.
U.S. Appl. No. 16/553,032 Office Action dated Mar. 29, 2021.
U.S. Appl. No. 16/553,032 Final Office Action dated Sep. 29, 2021.
U.S. Appl. No. 16/559,519 Final Office Action dated May 24, 2021.
Galitsky et al., Boris; "Matching parse thickets for open domain question answering", Data & Knowledge Engineering, vol. 107, Dec. 9, 2016, pp. 24-50, XP029897089, ISSN: 0169-023X, DOI: 10.1016/J.DATAK.2016.11.002.
European Application No. 19771324.1 Extended European Search Report dated Jan. 4, 2022.
U.S. Appl. No. 16/571,993 Office Action dated Dec. 3, 2021.
Bonomi et al., Silvia: "B-CoC: A Blockchain-based Chain of Custody for Evidences Management in Digital Forensics", Arxiv. org, Cornell University Library, Jul. 26, 2018.
Giuliani, Manuel et al.,"MuDis—A Multimodal Dialogue System for Human-Robot Interaction", Proceedings of The International Workshop on Cognition for Technical Systems 2008 (Oct. 30, 2008), pp. 1-6.
European Application No. 19857648.0 Extended European Search Report dated Mar. 21, 2022.
European Application No. 19860927.3 Extended European Search Report dated Apr. 7, 2022.
U.S. Appl. No. 16/571,993 Final Office Action dated May 26, 2022.
U.S. Appl. No. 16/559,519 Office Action dated Mar. 16, 2022.

\* cited by examiner

SYSTEM FOR PROVIDING DIALOGUE GUIDANCE

CROSS-REFERENCE TO RELATED APPLICATIONS

The present application claims the priority benefit of U.S. provisional patent application No. 62/727,965 filed on Sep. 6, 2018, entitled "SYSTEM AND METHOD FOR SENTIMENT DETECTION AND DIALOGUE GUIDANCE," the contents of which are hereby expressly incorporated by reference in their entirety.

1. FIELD OF THE INVENTION

The present invention relates to sentiment detection in dialogue guidance systems.

2. DESCRIPTION OF THE RELATED ART

Humans constantly engage in persuasive discourse across various media of interaction. It is often the case that parties engaged in persuasive discourse are unaware of the internal motivations of other parties participating in the discourse. In many cases, a party may not even be entirely aware of their own internal motivations. This unawareness of baseline motivations may cause participants to "talk past each other" and thus greatly reduce the efficiency of communication.

People often find it difficult to ascertain a sentiment or disposition of listeners during presentations, arguments, and other types of discourse. While training and practice can allow people to improve their ability to ascertain sentiment and/or dispositions, human-based methodologies are notoriously unreliable and often result in incorrect assessments. A presenter, speaker, or debater and the like incorrectly assessing sentiments or dispositions of other participants to a dialogue can result in ineffective framing and/or presenting of arguments, points, references, and other information.

It is with these observations in mind, among others, that aspects of the present disclosure were concerned and developed.

DETAILED DESCRIPTION

Aspects of the present disclosure involve systems and methods for detecting a sentiment of, for example, an audience and providing sentiment-based guidance for discourse such as argument or debate.

Dialogue participants, such as an audience or other dialogue recipient, may receive information (e.g., a presentation or dialogue) differently based on either or both of individual and group sentiment and disposition. Generally, a presenter may realize increased success (e.g., convincing an audience of a stance, informing an audience, etc.) when made aware of the sentiment and disposition of other dialogue participants. The presenter can adjust aspects of how ideas are presented in response to participant sentiment and disposition. Further, the sentiment and disposition can be used to automatically adjust dialogue submitted by the presenter (e.g., via text based medium such as email or message board, etc.) to conform to reader sentiment on either an individual (e.g., each reader receives a respectively adjusted dialogue) or group basis (e.g., all readers receive a tonally optimized dialogue).

For example, some audiences may be sympathetic (or antagonistic or apathetic) to certain group interests (e.g., social justice, economic freedom, etc.), contextual frameworks, and the like. Those in discourse with such audiences may find it advantageous to adjust word choice, framing references, pace, duration, rhetorical elements, illustrations, reasoning support models, and other aspects of a respective dialogue. In some cases, for example, it may be advantageous to engage in an inquisitive or deliberative form of dialogue, whereas in other cases (e.g., before other audiences) the same ideas and points may be more likely to be successfully conveyed in a persuasive or negotiation form of dialogue.

However, it is often difficult for a human to accurately determine the sentiment or disposition of an audience. In some cases, a person may be too emotionally invested in the content being conveyed. In other cases, it may be difficult to gauge sentiment and disposition due to audience size or physical characteristics of the space where the dialogue is occurring (e.g., the speaker may be at an angle or the like to the audience, etc.). A speaker may also be a poor judge of audience sentiment and disposition, for whatever reason, and so likely to misjudge or fail to ascertain the audience sentiment and disposition.

A three-phase process can be enacted to alleviate the above issues as well as augment intra-human persuasion (e.g., dialogue, presentation, etc.). Premises and their reasoning interrelationships may first be identified and, in some cases, communicated to a user. In a second phase, a user or users may be guided toward compliance with particular persuasive forms (e.g., avoidance of fallacies, non-sequiturs, ineffective or detrimental analogies, definition creep or over-broadening, etc.). In some examples, guidance can occur in real-time such as in a presentational setting or keyed-in messaging and the like. Further, in a third phase, guiding information can be augmented and/or supplemented with visual and/or audio cues and other information, such as social media and/or social network information, regarding members to a dialogue (e.g., audience members at a presentation and the like). It is with the second and third phases which the systems and methods disclosed herein are primarily concerned.

In some examples, static information such as, without imputing limitation, demographic, location, education, work history, relationship status, life event history, group membership, cultural heritage, and other information can be used to guide dialogue. In some examples, dynamic information such as, without imputing limitation, interaction history (e.g., with the user/communicator, regarding the topic, with the service or organization associated with the dialogue, over the Internet generally, etc.), speed of interaction, sentiment of interaction, mental state during interaction (e.g., sobriety, etc.), limitations of the medium of dialogue (e.g., screen size, auditorium seating, etc.), sophistication of participants to the dialogue, various personality traits (e.g., aggressive, passive, defensive, victimized, etc.), search and/or purchase histories, errors and/or argument ratings or histories within the corresponding service or organization, evidence cited in the past by dialogue participants, and various other dynamic factors which may be used to determine dialogue guidance.

In particular, the above information may be brought to bear in a micro-sculpted real-time communication by, for example and without imputing limitation, determining changes to be made in colloquialisms, idioms, reasoning forms, evidence types or source, vocabulary or illustration choices, or sentiment language. The determined changes can be provided to a user (e.g., a speaker, communicator, etc.) to increase persuasiveness of dialogue by indicating more effective paths of communication to achieving understanding by other dialogue participants (e.g., by avoiding triggers or pitfalls based on the above information).

In one example, visual and audio data of an audience can be processed during and throughout a dialogue. The visual and audio data may be used by Natural Language Processing (NLP) and/or Computer Vision (CV) systems and services in order to identify audience sentiment and/or disposition. CV/NLP processed data can be processed by a sentiment identifying service (e.g., a trained deep network, a rules based system, a probabilistic system, some combination of the aforementioned, or the like) which may receive analytic support by a group psychological deep learning system to identify sentiment and/or disposition of audience members. In particular, the system can provide consistent and unbiased sentiment identification based on large volumes of reference data.

Identified sentiments and/or dispositions can be used to select dialogue forms. For example, and without imputing limitation, dialogue forms can be generally categorized as forms for sentiment-based dialogue and forms for objective-based dialogue. Sentiment-based dialogue forms can include rules, lexicons, styles, and the like for engaging in dialogue (e.g., presenting to) particular sentiments. Likewise, objective-based dialogue forms may include rules, lexicons, styles, and the like for engaging in dialogue in order to achieve certain specified objectives (e.g., persuade, inform, etc.). Further, multiple dialogue forms can be selected and exert more or less influence based on respective sentiment and/or objectives or corresponding weights and the like.

Selected dialogue forms may be used to provide dialogue guidance one or more users (e.g., speakers or participants). For example, dialogue guidance may include restrictions (e.g., words, phrases, metaphors, arguments, references, and such that should not be used), suggestions (e.g., words, phrases, metaphors, arguments, references, and such that should be used), or other guidance. Dialogue forms may include, for example and without imputing limitation, persuasion, negotiation, inquiry, deliberation, information seeking, Eristics, and others.

In some examples, dialogue forms may also include evidence standards. For example, persuasive form may be associated with a heightened standard of evidence. At the same time, certain detected sentiments or dispositions may be associated with particular standards of evidence or source preferences. For example, a dialogue participant employed in a highly technical domain, such as an engineer or the like, may be disposed towards (e.g., find more persuasive) sources associated with a particular credential (e.g., a professor from an alma mater), a particular domain (e.g., an electrical engineering textbook), a particular domain source (e.g., an IEEE publication), and the like. In some examples, a disposition or sentiment may be associated with heightened receptiveness to particular cultural references and the like. Further, in cases where multiple dialogue forms interact or otherwise are simultaneously active (e.g., where a speaker is attempting to persuade an audience determined by the sentiment identification system to be disposed towards believing the speaker), an evidence standard based on both these forms may be suggested to the speaker.

Likewise, dialogue forms may also include premise interrelationship standards. For example, threshold values, empirical support, substantiation, and other characteristics of premise interrelationships may be included in dialogue forms. The premise interrelationship standards can be included directly within or associated with dialogue forms as rules, or may be included in a probabilistic fashion (e.g., increasing likelihoods of standards, etc.), or via some combination of the two.

Dialogue forms can also include burden of proof standards. For example, and without imputing limitation, null hypothesis requirements, references to tradition, "common sense", principles based on parsimony and/or complexity, popularity appeals, default reasoning, extension and/or abstractions of chains of reasoning (in some examples, including ratings and such), probabilistic falsification, prerequisite premises, and other rules and/or standards related to burden of proof may be included in or be associated with particular dialogue forms.

Once one or more dialogue forms have been selected based on identified sentiment and/or disposition, the forms can be presented to a user (e.g., a speaker) via a user device or some such. In some examples, the dialogue forms can be applied to preexisting information such as a written speech and the like. The dialogue forms can also enable strategy and/or coaching of the user.

Figure 1A:
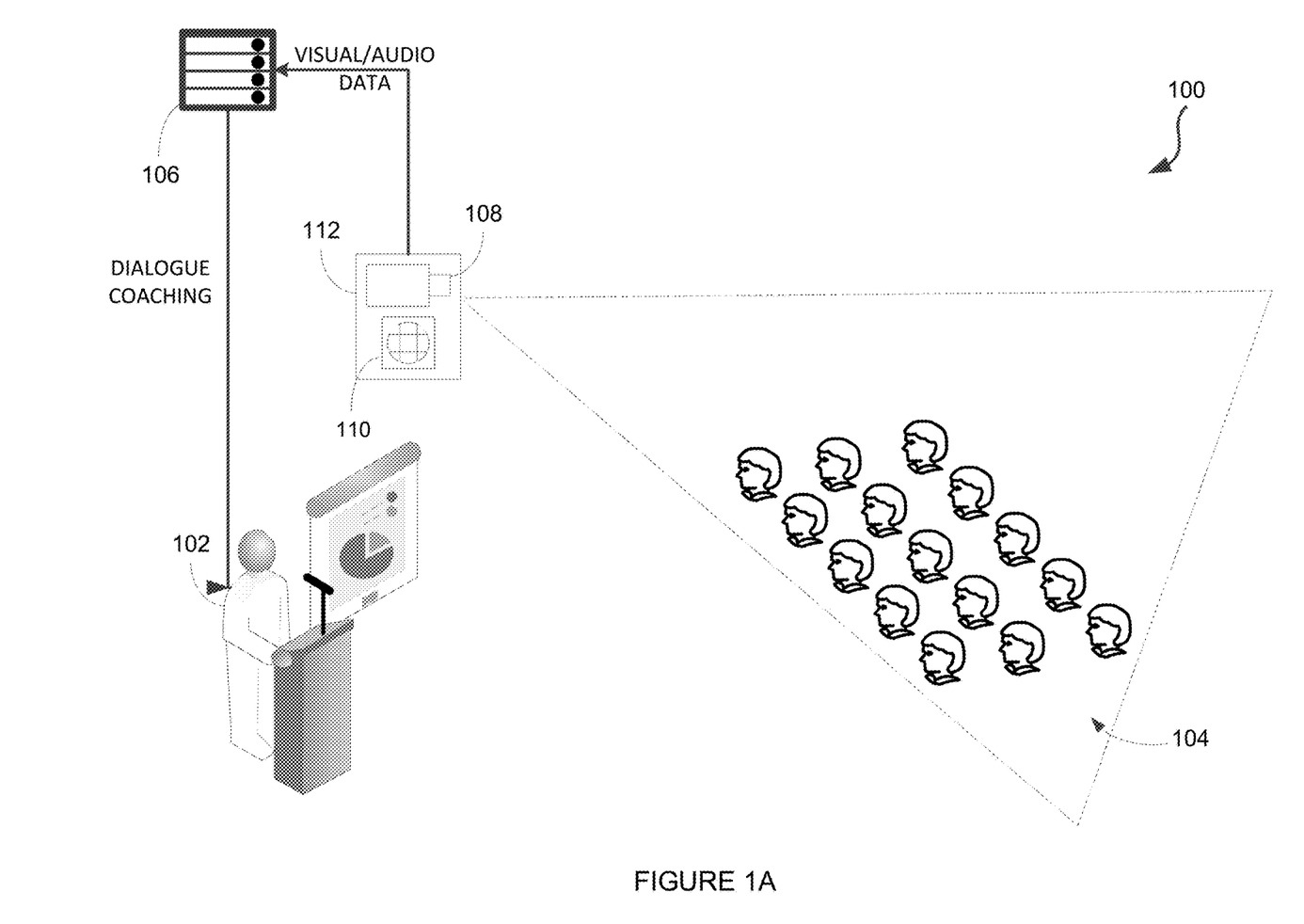
FIGS. 1A-B illustrate exemplary operating environments in which systems and methods of the disclosure may be deployed, according to some embodiments of the subject technology.

FIG. 1A depicts an example of an operational environment 100 for a sentiment detection and dialogue guidance system. A speaker 102 presents to an audience 104 while receiving automated and dynamic presentation coaching provided by the sentiment detection dialogue guidance system.

As speaker 102 presents to audience 104, an input capture system 112 retrieves visual and audio data from members of audience 104 within a capture range. Here, the capture range is denoted by a dotted line triangle. While the range is depicted as static, it is understood that in some examples, such as where tracking of a particular audience member or some such is needed, the range may be dynamic and/or include other systems and subsystems to capture relevant input data.

Input capture system 112 includes a video capture device 108 and an audio capture device 110. Input capture system 112 may be a dedicated device or, in some examples, a mobile device such as a smartphone and the like with video and audio capture capability.

Audio and visual data captured by input capture system 112 can be provided to a processing device 106. Processing device 106 may be a local computer or may be a remotely hosted application or server.

Processing device 106 processes visual and audio data in order to provide dialogue coaching data to speaker 102. In effect, a real-time presentation (e.g., dialogue) coaching can be provided to speaker 102. This real-time coaching can dynamically change in response to sentiment and disposition changes of audience 104, either on a per member basis or as a whole, detected by input capture system 112.

Figure 1B:
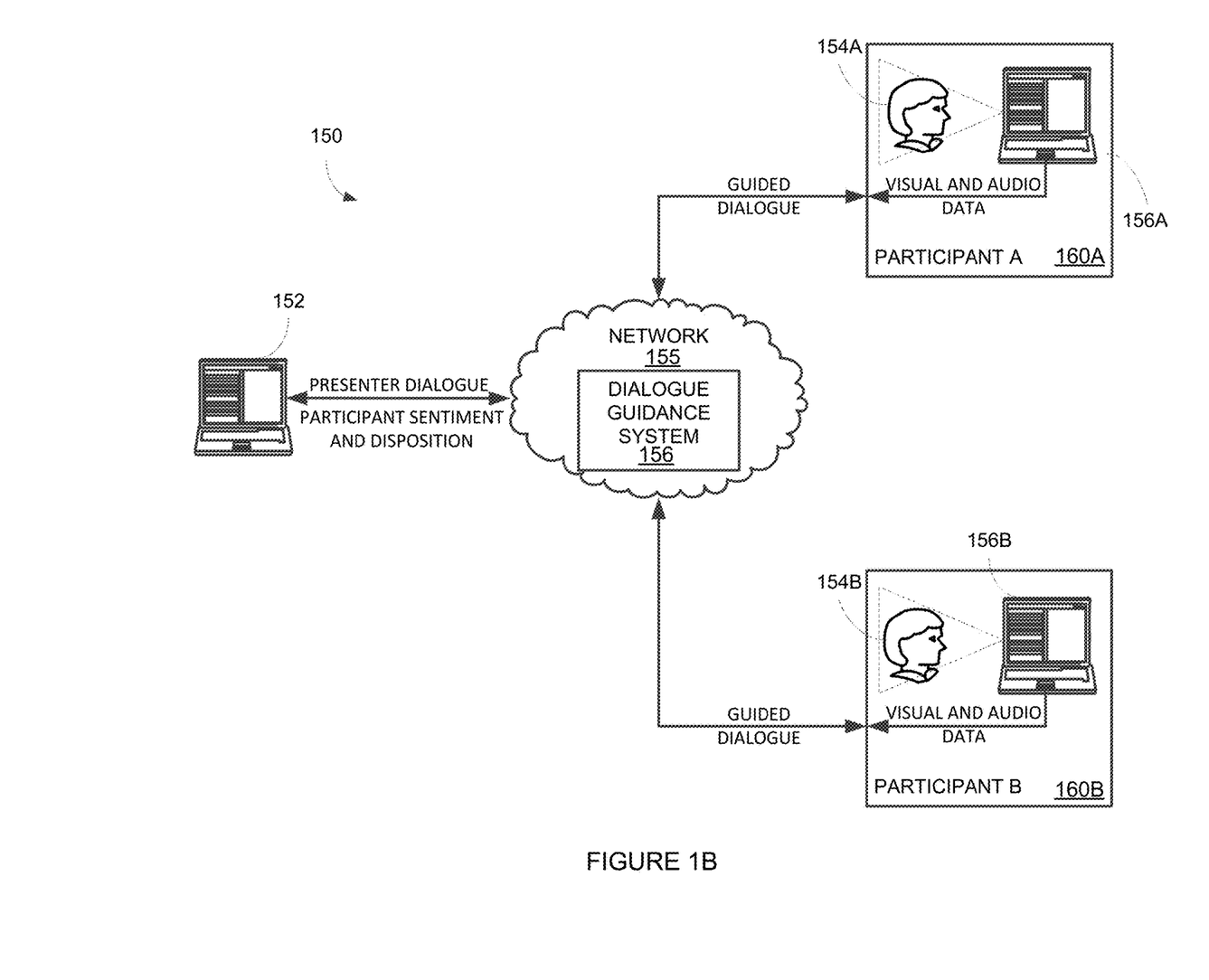

FIG. 1B depicts an example of an operational environment 150 for dialogue guidance system 156. In comparison to operational environment 100, operational environment 150 of FIG. 1B can be asynchronous and includes guidance bespoke to individual participant sentiment and disposition. For example, dialogue in operational environment 150 may take place over email, a message board, instant message, voice over internet protocol (VoIP), video conferencing, or other network communication.

Presenter dialogue is transmitted from a computer 152 over network 155 (e.g., the Internet, etc.) so that it can be received by participant A 160A and/or participant B 160B. During transmission, dialogue guidance system 156 can determine sentiments and dispositions for participant A 160A and participant B 160B and apply respective dialogue guidance to versions of presenter dialogue corresponding to each participant. Further, dialogue guidance system 156 can provide participant sentiment and disposition information back to computer 152 for a presenter to review. In some examples, dialogue guidance system 156 can additionally, or instead, provide information related to dialogue guidance for respective participants 160A-B in order to provide a presenter with a robust understanding of each dialogue participant mental state.

Here, dialogue participant A 160A and dialogue participant B 160B are depicted as including a single person 154A and 154B respectively. However, it is understood that multiple people may be included as a dialogue participant and that either or both of individual sentiments and dispositions or aggregated group sentiments and dispositions can be determined and accounted for by dialogue guidance system 156.

Visual and audio data retrieved by computers 156A-B associated with respective participants 160A-B can be processed by dialogue guidance system 156 in determining participant sentiment. Additionally, in some examples, dialogue guidance system 156 can retrieve supplemental information related to participating people 154A-B over network 155 such as social media, social network, message board history (or histories), and the like. Dialogue guidance system 156 may then utilize the visual and audio data along with any supplemental information to determine sentiments and dispositions, determine guidance, and apply the guidance automatically to the presenter dialogue to generate bespoke guided dialogue respective to each participant 160A-B and based on respective sentiments and dispositions. This can be performed asynchronously or, in other words, provided to participants 160A-B at different times (e.g., as a participant logs into a forum account, checks an email account, opens an instant message client, etc.).

Figure 2:
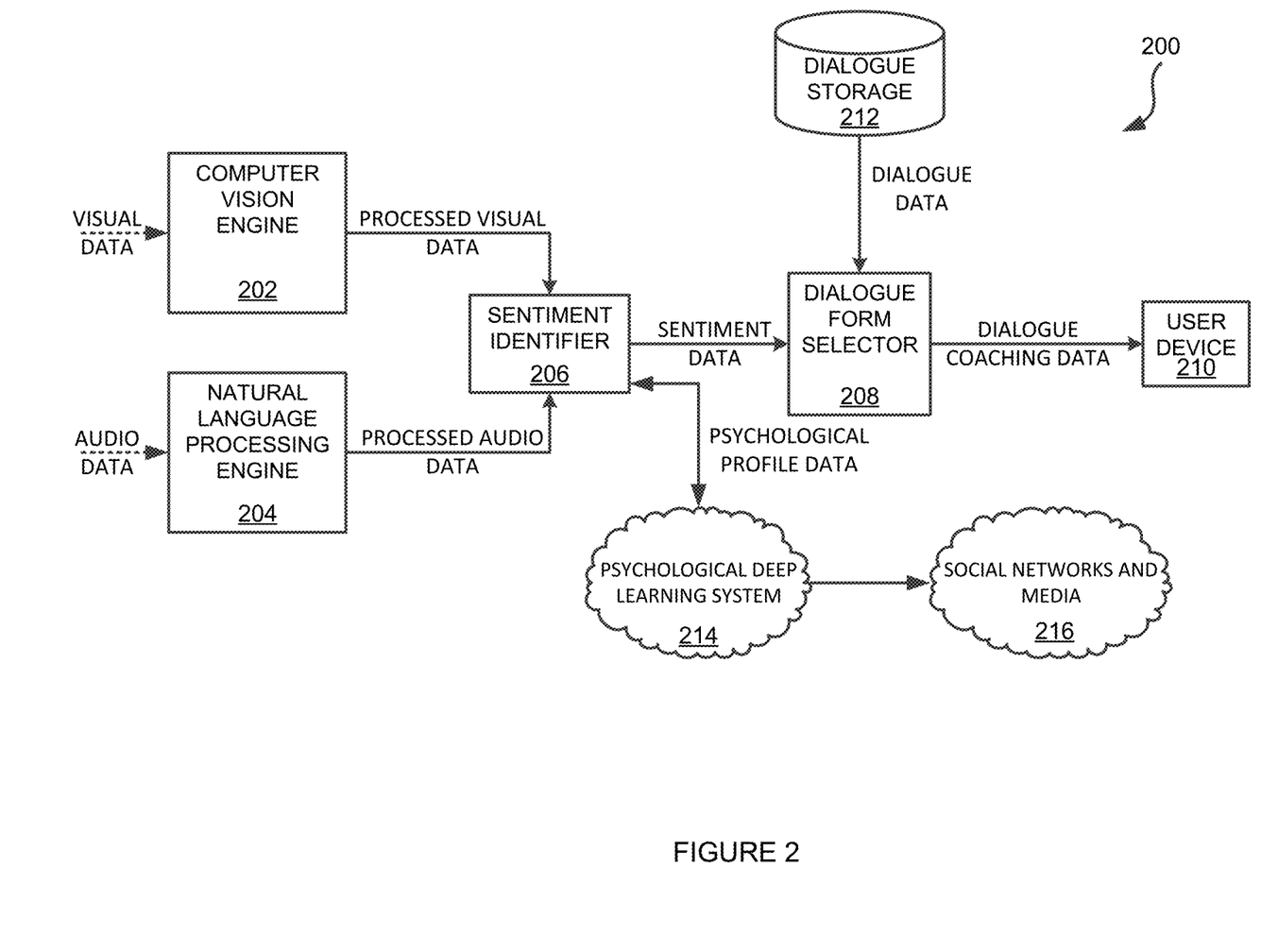
FIG. 2 is a block diagram depicting a system for sentiment detection and dialogue guidance, according to some embodiments of the subject technology.

FIG. 2 depicts a sentiment detection and dialogue guidance system 200. System 200 may be implemented as an application on a computing device such as processing device 106. System 200 receives visual and audio input in order to provide dialogue data (e.g., coaching data) to a user via a smartphone, tablet, desktop, laptop, or other device.

A computer vision engine 202 receives visual data while a natural language processing engine 204 receives audio data. In some examples, visual and audio data is transmitted directly from video and/or audio devices. In some examples, visual and audio data can be preprocessed or provided remotely, from stored files, or other sources.

Computer vision engine 202 and natural language processing engine 204 respectively transmit prepared visual and audio data to a sentiment identifier service 206. Prepared visual and audio data may, for example, include flags at various portions of the visual and audio data, include clips or snapshots, isolated or extracted sources (e.g., for tracking a particular audience member and the like), multiple channels based on one or more feeds, or other transformations as may be used by sentiment identifier 206 to identify audience sentiment and/or dispositions.

Sentiment identifier service 206 can determine a sentiment or disposition of an audience at individual levels and/or at an aggregated level based on the audio and visual data. In some examples, sentiment identifier 206 can exchange data with a psychological deep learning system 214. Psychological deep learning system 214 may interconnect with social networks and media 216 to retrieve additional information on an audience and/or individuals within the audience. For example, psychological deep learning system 214 can derive and/or explore a social graph (e.g., generate a social topology and the like) associated with one or more audience members to supplement or complement information used by psychological deep learning system 214 in creation of various profiles.

Psychological deep learning system 214 can include general, specific, or mixed profiles generated by deep learning systems and the like. The profiles may assist sentiment identifier service 206 in determining audience sentiment and disposition based on visual cues (e.g., facial expressions, etc.), audio cues (e.g., audible responses, etc.), and the like.

Sentiment identifier service 206 transmits sentiment data to a dialogue form selector service 208. Dialogue form selector service 208 processes received sentiment data to retrieve rules, metrics, guidance, and/or restrictions as discussed above. In some examples, dialogue form selector service 208 retrieves stored dialogue data (e.g., prepared speeches, etc.) for applying selected dialogue forms.

Dialogue form selector service 208 transmits dialogue coaching data to a user device 210. User device 210 may be a computer, mobile device, smartphone, tablet, or the like. In some examples, rather than, or in addition to, user device 210, dialogue coaching data may be transmitted to downstream processes or services. For example, application programming interface (API) endpoints may receive dialogue coaching data for storage, model training, and other processes.

In some examples, dialogue coaching data includes prepared statements. In other examples, dialogue coaching data may provide rules, guidance, restrictions, metrics, and the like.

Figure 3:
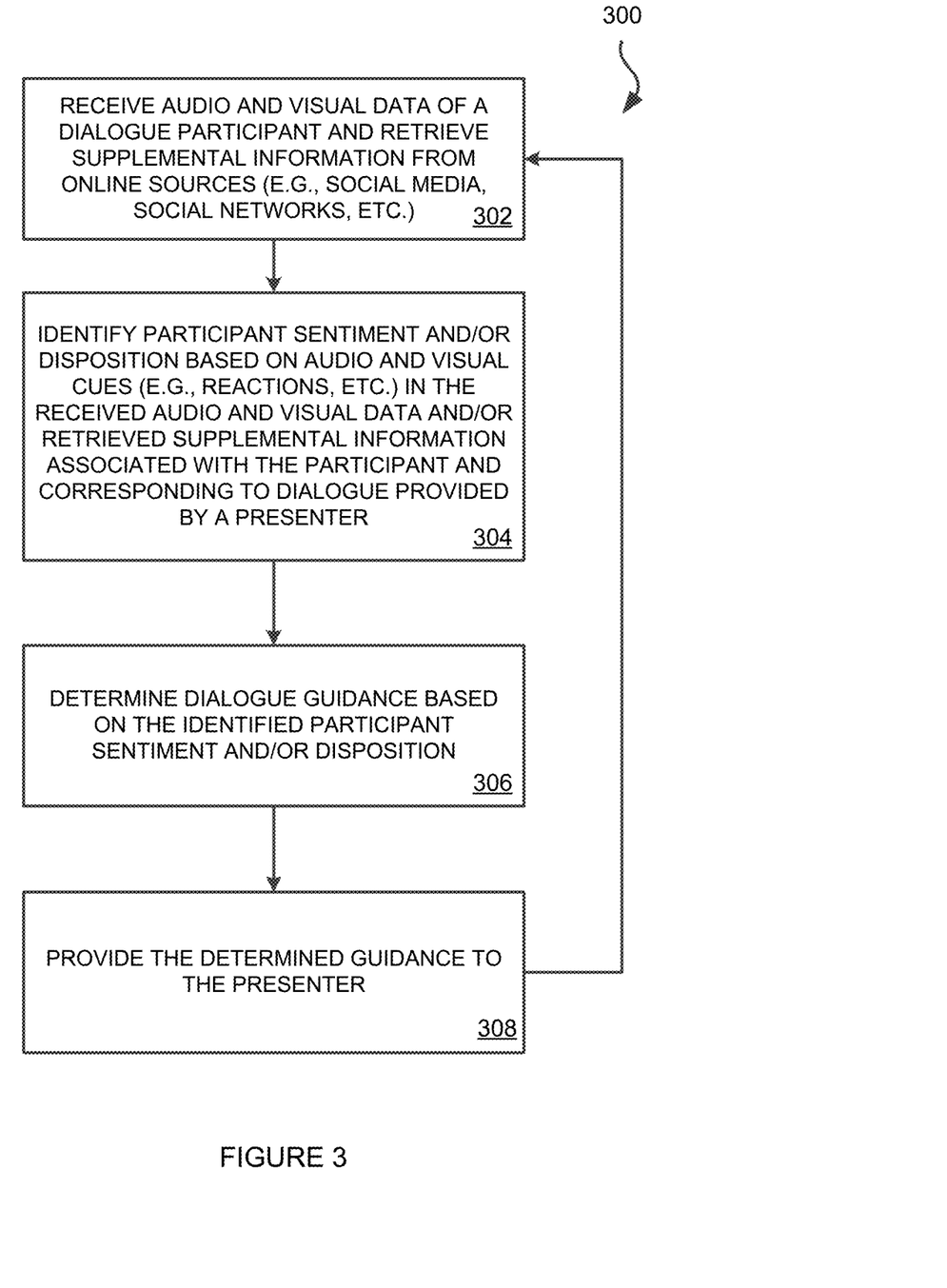
FIG. 3 is a flowchart of a method for detecting sentiment and guiding dialogue, according to some embodiments of the subject technology.

FIG. 3 depicts a method 300 for processing audio and visual data to generate guidance information for a speaker. Audio and visual data for a participant to a dialogue are received and supplemental information relating to the participant is retrieved (operation 302). In some examples, the audio and visual data may be provided as individual streams such as from one or more respective cameras and one or more respective microphones. In other examples, a single system may provide a multi-layered data stream including both audio and visual data. The supplemental information can be retrieved, via API and the like, from social media and/or social network platforms such as Twitter® or Facebook® and the like.

Audio and/or visual cues within the received audio and visual data along with the retrieved supplemental information are then used to identify participant sentiment and/or disposition in response to a presenter dialogue (operation 304). For example, audience gaze, respiratory response (e.g., gasps, sighs, etc.), and the like can may be associated with a sentiment. Machine learning models such as deep neural networks, regressions, support vector machines (SVMs), and other techniques may be used to identify sentiments.

The identified audience sentiment is then used to determine dialogue guidance (operation 306). Dialogue guidance can include restrictions, recommendations, and the like as discussed above. In some examples, dialogue guidance may include prepared statements, etc. The determined guidance is then provided to the presenter (operation 308). In some examples, such as where the dialogue takes place over a text medium like a forum and the like, the determined guidance can be automatically applied to the dialogue in addition to, or rather than, providing the guidance to the presenter.

As seen in FIG. 3, method 300 may repeat to provide continuous and/or streaming dialogue guidance to a speaker. In some examples, dialogue guidance may include recommendations regarding semantic framing, references, lexicon and the like. In other examples, dialogue guidance may include prepared comments to be read by the speaker (e.g., via semantic transforms and other NLP processes). Additionally, where the dialogue is text based and different participants may receive the dialogue individually and independently, the dialogue may be automatically modified according to determined guidance respective to sentiments and/or dispositions determined for each recipient at the time of receipt such that one message from the presenting user could be customized for each individual reader according to their state or sentiment at the time of their receipt, even if those receipt times and recipient sentiments were different for the different recipients and even though all the received messages might be deemed to have an equivalent persuasive effect (EPE). EPE can include anticipated levels of impact upon or deflection to a belief held by a dialogue participant, tested responses to a corresponding subject matter of the dialogue participant (e.g., using before and after testing, A/B testing, etc.), physiological response tests (e.g., via brain scans, etc.), and the like which may provide further information to, for example, dialogue guidance system 156, for optimizing dialogue guidance.

Various aspects of the subject technology relate to a dialogue guidance system. The dialogue guidance system is configured to receive input data captured from a communication event among at least a first participant and a second participant. The communication event may include a presentation or other message or communication. The participants may be, for example, one or more presenters and one or more audience members or recipients of the communication.

The input data may include one or more of text data, audio data, or video data. The dialogue guidance system is configured to identify, based on the input data, one of a sentiment or a disposition corresponding to the communication event, determine dialogue guidance for the first participant based on one of the sentiment or the disposition, and provide the dialogue guidance to one or more of the participants.

The dialogue guidance system may also be configured to retrieve supplemental information corresponding to at least one of the first participant and the second participant, the supplemental information including one or more of social media information, social network information, or web platform information and the sentiment or disposition may further be identified based on the supplemental information.

According to some aspects, the dialogue guidance system may include one or more processors and at least one non-transitory computer-readable medium having stored therein instructions which, when executed by the one or more processors, cause the dialogue guidance system to perform operations. The operations may include receiving, from an input capture system, input data associated with a presentation, identifying a sentiment or a disposition corresponding to the presentation based on the input data, determining dialogue guidance for a presenter of the presentation, and providing the dialogue guidance to the presenter. The input data may be associated with the presenter or of one or more members of an audience of the presentation. Furthermore, the dialogue guidance may be provided to the presenter during the presentation or after it.

A sentiment identifier service, a dialogue form selector service, or other services may also be leveraged by the dialogue guidance system. For example, the dialogue guidance system may transmit, over a network to a sentiment identifier service, a query for the sentiment or disposition or transmit, over a network to a dialogue form selector service, a query for the dialogue guidance.

Aspects of the subject technology also relate to a method for providing dialogue guidance. The method may include receiving input data associated with a dialogue participant, the input data comprising one or more of text data, audio data, or video data, identifying one of a sentiment or a disposition corresponding to the dialogue participant based on the input data, determining, based on one of the sentiment or the disposition, dialogue guidance for a presenter, and providing the dialogue guidance to the presenter. The dialogue participant may be a member of an audience or the presenter. The identifying of the sentiment or disposition is based on a deep learning system.

The determining of the dialogue guidance may include selecting at least one dialogue form comprising a rule for communicating, wherein the at least one dialogue form corresponds to the identified sentiment or disposition. The rule for communicating may include restrictions, suggestions, or standards. The method may also include processing the input data using at least one of a Natural Language Processing (NLP) and/or Computer Vision (CV) systems.

Figure 4:
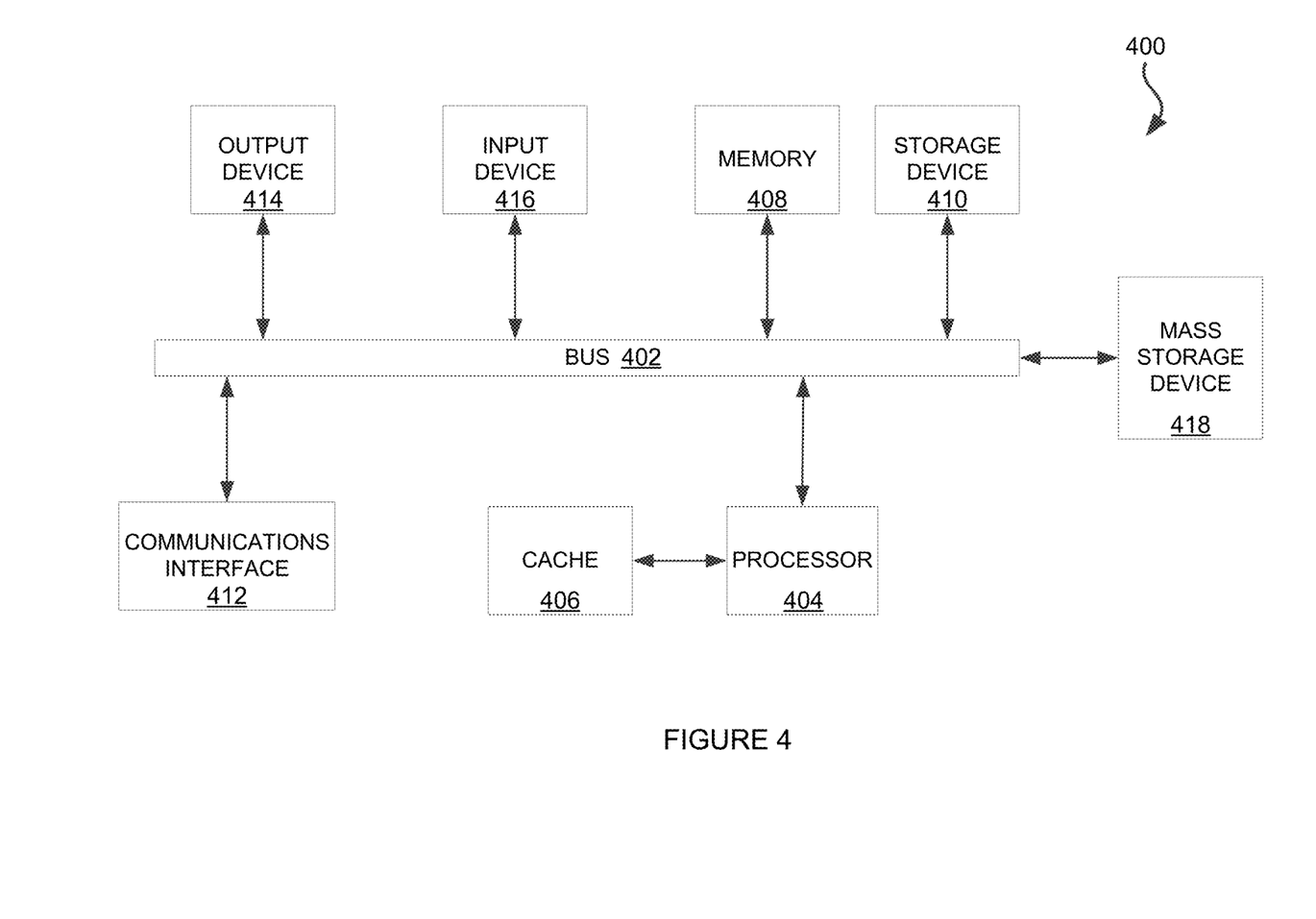
FIG. 4 is a system diagram of an example computing system that may implement various systems and methods discussed herein, in accordance with various embodiments of the subject technology.

FIG. 4 is an example computing system 400 that may implement various systems and methods discussed herein. The computer system 400 includes one or more computing components in communication via a bus 402. In one implementation, the computing system 400 includes one or more processors 404. The processor 404 can include one or more internal levels of cache 406 and a bus controller or bus interface unit to direct interaction with the bus 402. The processor 404 may specifically implement the various methods discussed herein. Main memory 408 may include one or more memory cards and a control circuit (not depicted), or other forms of removable memory, and may store various software applications including computer executable instructions, that when run on the processor 404, implement the methods and systems set out herein. Other forms of memory, such as a storage device 410 and a mass storage device 418, may also be included and accessible, by the processor (or processors) 404 via the bus 402. The storage device 410 and mass storage device 418 can each contain any or all of the methods and systems discussed herein.

The computer system 400 can further include a communications interface 412 by way of which the computer system 400 can connect to networks and receive data useful in executing the methods and system set out herein as well as transmitting information to other devices. The computer system 400 can also include an input device 416 by which information is input. Input device 416 can be a scanner, keyboard, and/or other input devices as will be apparent to a person of ordinary skill in the art. An output device 414 can be a monitor, speaker, and/or other output devices as will be apparent to a person of ordinary skill in the art.

The system set forth in FIG. 4 is but one possible example of a computer system that may employ or be configured in accordance with aspects of the present disclosure. It will be appreciated that other non-transitory tangible computer-readable storage media storing computer-executable instructions for implementing the presently disclosed technology on a computing system may be utilized.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the methods can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a computer-readable storage medium having stored thereon instructions, which may be used to program a computer system (or other electronic devices) to perform a process according to the present disclosure. A computer-readable storage medium includes any mechanism for storing information in a form (e.g., software, processing application) readable by a computer. The computer-readable storage medium may include, but is not limited to, optical storage medium (e.g., CD-ROM), magneto-optical storage medium, read only memory (ROM), random access memory (RAM), erasable programmable memory (e.g., EPROM and EEPROM), flash memory, or other types of medium suitable for storing electronic instructions.

The description above includes example systems, methods, techniques, instruction sequences, and/or computer program products that embody techniques of the present disclosure. However, it is understood that the described disclosure may be practiced without these specific details.

While the present disclosure has been described with references to various implementations, it will be understood that these implementations are illustrative and that the scope of the disclosure is not limited to them. Many variations, modifications, additions, and improvements are possible. More generally, implementations in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method for dialogue guidance generation, the method comprising:
   receiving input data associated with a plurality of human participants, the input data comprising one or more of text data, audio data, or video data;
   identifying one of a sentiment or a disposition corresponding to each of the plurality of human participants in real-time based on the input data, wherein the disposition is based on historical behavior associated with each of the plurality of human participants;
   determining a dialogue guidance for increasing a persuasiveness of a dialogue for a first human participant who is presenting the dialogue with an objective of persuading at least a subset of the plurality of human participants regarding a topic, wherein the dialogue guidance is based on the sentiment or the disposition of the plurality of human participants as identified, wherein the dialogue guidance suggests one or more modifications to content of the dialogue to increase the persuasiveness while maintaining at least the topic; and
   providing the dialogue guidance to the first human participant during presentation by the first human participant of the dialogue according to the dialogue guidance.

2. The method of claim 1, further comprising retrieving supplemental information corresponding to each of the plurality of human participants, wherein identifying the sentiment or the disposition is further based on the supplemental information, wherein the supplemental information includes at least one of social media information, social network information, or web platform information.

3. The method of claim 1, wherein determining the dialogue guidance comprises selecting at least one dialogue form comprising a rule for communicating, wherein the at least one dialogue form corresponds to the sentiment or the disposition of the plurality of human participants as identified.

4. The method of claim 3, wherein the rule for communicating comprises at least one of a restriction, a suggestion, an evidence standard, a premise interrelationship standard, or a burden of proof standard.

5. The method of claim 1, further comprising processing the input data using at least one of a natural language processing (NLP) system or a computer vision (CV) system.

6. The method of claim 1, wherein identifying the sentiment or the disposition of the plurality of human participants is based on input of the input data into a deep learning system.

7. The method of claim 1, wherein providing the dialogue guidance to the first human participant includes displaying the dialogue guidance using display.

8. The method of claim 1, wherein providing the dialogue guidance to the first human participant includes transmitting the dialogue guidance to a user device of the first human participant over a network.

9. The method of claim 1, wherein the one or more modifications to the content of the dialogue include one or more modifications to language of the dialogue.

10. The method of claim 1, wherein at least a dialogue portion within the dialogue guidance provided to the first human participant is automatically modified based on real-time indications of the sentiment or the disposition of the plurality of human participants during presentation by the first human participant of the dialogue according to the dialogue guidance.

11. The method of claim 10, wherein the presentation by the first human participant includes one or more messages corresponding to the dialogue portion that are received by each of the plurality of human participants at a respective time of receipt, and wherein automatically modifying the dialogue portion includes automatically modifying the one or more messages at the respective time of receipt by each of the plurality of human participants.

12. A dialogue guidance system comprising:
   a communication interface that receives input data from an input capture system, the input data associated with a presentation audience and comprising one or more of text data, audio data, or video data; and
   one or more processors that execute instructions stored in memory, wherein execution of the instructions by the one or more processors causes the one or more processors to:

identify one of a sentiment or a disposition corresponding to each of the presentation audience in real-time based on the input data, wherein the disposition is based on historical behavior associated with each of the presentation audience;

determine, based on the sentiment or the disposition of each of the presentation audience as identified, a dialogue guidance for increasing a persuasiveness of a presentation for a presenter who is presenting the presentation with an objective of persuading at least a subset of the presentation audience regarding a topic, wherein the dialogue guidance suggests one or more modifications to content of the presentation to increase the persuasiveness while maintaining at least the topic; and provide the dialogue guidance to the presenter during presentation by the presenter of the presentation according to the dialogue guidance.

13. The dialogue guidance system of claim 12, wherein at least a portion of the input data is captured by a device associated with the presenter of the presentation.

14. The dialogue guidance system of claim 12, wherein at least a portion of the input data is captured by at least one device associated with one or more members of the presentation audience.

15. The dialogue guidance system of claim 12, further comprising a display, wherein the one or more processors are configured to provide the dialogue guidance to the presenter at least in part by displaying the dialogue guidance using the display.

16. The dialogue guidance system of claim 12, wherein execution of the instructions by the one or more processors causes the one or more processors to further:

transmit a query for the sentiment or disposition over a communication network to a sentiment identifier service using the communication interface.

17. The dialogue guidance system of claim 12, wherein execution of the instructions by the one or more processors causes the one or more processors to further:

transmit a query for the dialogue guidance to a dialogue form selector service using the communication interface.

18. A non-transitory computer-readable storage medium having embodied thereon instructions executable by one or more processors to perform a method for dialogue guidance generation, the method comprising:

receiving input data captured from a communication event among a plurality of human participants, the input data comprising one or more of text data, audio data, or video data;

identifying one of a sentiment or a disposition of each of the plurality of human participants corresponding to the communication event in real-time based on the input data, wherein the disposition is based on historical behavior associated with each of the plurality of human participants;

determining a dialogue guidance for increasing a persuasiveness of a dialogue for a first human participant who is presenting the dialogue with an objective of persuading at least a subset of the plurality of human participants regarding a topic, wherein the dialogue guidance is based on the sentiment or the disposition of each of the plurality of human participants as identified, wherein the dialogue guidance suggests one or more modifications to content of the dialogue to increase the persuasiveness while maintaining at least the topic; and providing the dialogue guidance for a presentation to the first human participant during presentation by the first human participant of the dialogue according to the dialogue guidance.

19. The non-transitory computer-readable storage medium of claim 18, wherein the communication event includes a message, and wherein the first human participant is a presenter of the message.

20. The non-transitory computer-readable storage medium of claim 18, wherein the communication event includes a message, and wherein the first human participant is a recipient of the message.

21. The non-transitory computer-readable storage medium of claim 18, further comprising instructions executable to retrieve supplemental information corresponding to the plurality of human participants, the supplemental information including one or more of social media information, social network information, or web platform information; wherein the sentiment or disposition is further identified based on the supplemental information.

22. A method for dialogue guidance generation, the method comprising:

receiving input data associated with a plurality of human participants, the input data comprising one or more of text data, audio data, or video data;

identifying one of a sentiment or a disposition corresponding to each of the plurality of human participants in real-time based on the input data, wherein the disposition is based on historical behavior associated with each of the plurality of human participants;

determining a dialogue guidance for increasing a persuasiveness of a dialogue for a first human participant who is presenting the dialogue with an objective of persuading at least a subset of the plurality of human participants regarding a topic, wherein the dialogue guidance is based on the sentiment or the disposition of the plurality of human participants as identified, wherein the dialogue guidance suggests one or more modifications to content of the dialogue to increase the persuasiveness while maintaining at least the topic; and providing the dialogue guidance to the first human participant as the dialogue is presented by the first human participant according to the dialogue guidance.

* * * * *